United States Patent [19]

Ward

[11] Patent Number: 5,028,931

[45] Date of Patent: Jul. 2, 1991

[54] ADAPTIVE ARRAY PROCESSOR

[75] Inventor: Christopher R. Ward, Stortford Herts, Great Britain

[73] Assignee: STC PLC, London, England

[21] Appl. No.: 528,596

[22] Filed: May 24, 1990

[51] Int. Cl.$^5$ .............................................. G01S 3/16
[52] U.S. Cl. ............................... 342/383; 364/724.15; 342/380
[58] Field of Search ................. 342/16, 379, 380, 383, 342/384; 364/724.15

[56] References Cited

U.S. PATENT DOCUMENTS

| | | | |
|---|---|---|---|
| 4,278,978 | 7/1981 | Easterling et al. | 342/379 |
| 4,555,706 | 11/1985 | Haupt | 342/379 |
| 4,578,676 | 3/1986 | Harrison, Jr. | 342/379 |
| 4,697,188 | 9/1987 | Lin | 342/383 |
| 4,752,969 | 6/1988 | Rilling | 342/380 X |

FOREIGN PATENT DOCUMENTS 2229580 9/1990 United Kingdom .

OTHER PUBLICATIONS

"Adaptive Lattice Filters for Channel Equalization"; M. J. Rutter et al.; Conference: Saraga Memorial Colloquim on Electronic Filters in Tele; London; May 1982.

Primary Examiner—Thomas H. Tarcza
Assistant Examiner—Tod Swann
Attorney, Agent, or Firm—Lee, Mann, Smith, McWilliams & Sweeney

[57] ABSTRACT

An off-line processor arrangement for a broadband accelerated convergence adaptive antenna array wherein signals from a plurality of antenna elements are applied to respective identical tapped delay lines (T) the outputs of which are fed through individual signal weighting means to a beamforming network (BFN), the arrangement including one or more lattice filter means (LF) to which the auxiliary antenna element signals are applied together with the output response of the beamforming network to compute sets of weight correction vectors (*W) with which to update weight coefficients and means for storing said updated coefficients, said stored coefficients being applied to the individual signal weighting means to weight the outputs of the tapped delay lines.

2 Claims, 3 Drawing Sheets

5,028,931

ADAPTIVE ARRAY PROCESSOR

BACKGROUND OF THE INVENTION

This invention relates to an off-line processor for a broadband accelerated convergence adaptive antenna array.

The objective of an adaptive antenna is to combine the signals received by the elements in an array to produce a far-field pattern that, in some sense, optimises the reception of a desired signal in the presence of jamming and noise. The substantial improvements in anti-jam performance offered by this form of array signal processing have meant that it is now becoming an essential requirement for many military radar, communication and navigation systems.

DESCRIPTION OF RELATED ART

A known type of combining circuit for a broadband adaptive array is shown in FIG. 1. Signals from the antenna array elements are received on individual channels which are identified as 'PRIMARY CHANNEL' and 'AUX CHANNELS'. The primary channel is applied via a time delay $T_D$ to a beamforming network BFN. The auxiliary channels 1 to N−1 are applied to respective tapped delay lines T, the outputs of which are fed through respective weighting networks to the beamforming network. Time delay $T_D$ in the PRIMARY channel compensates for the associated signal delay through the tapped delay line auxiliary weighting.

$W_{1,1}\ W_{1,2}\ W_{1,3}\ldots W_{n-1,1}\ W_{n-1,2}\ldots W_{n-1,m-1}\ W_{n-1,m}$ are applied to the weighting networks. The weighted outputs of the tapped delay lines are combined in the beamforming network BFN together with the primary channel signal to form the output response of the array. Normally, to reduce or eliminate the effect of a jamming signal the weights are calculated (by a signal processor not shown in FIG. 1) to form a beam pattern with broadband spatial nulls in the directions of the jammer sources. To avoid the array nulling toward the desired signal source it can be arranged for the array to adapt to null the jamming signal(s) during intervals when the desired signal is absent. The weights are then frozen while the desired signal is present and then recalculated during any pauses in the desired signal. Other schemes can be devised which prevent cancellation of the wanted signal.

Known forms of signal processing to calculate the required weights include the Widrow Least Mean Squares (LMS) algorithm or the least squares algorithm to minimise the output power of the beamformer. See for example, B Widrow et al, "Comparison of Adaptive Algorithms Based on the Methods of Steepest Descent and Random Search", IEEE Trans., 1976, AP-24, pp 615–637, and the time shared arrangement described in British patent application 2188782A.

SUMMARY OF THE INVENTION

According to the present invention there is provided an off-line processor arrangement for a broadband accelerated convergence adaptive antenna array wherein signals from a plurality of antenna elements are applied to respective identical tapped delay lines the outputs of which are fed through individual signal weighting means to a beamforming network, the arrangement including one or more lattice filter means to which the auxiliary antenna element signals are applied together with the output response of the beamforming network to compute sets of weight correction vectors with which to update weight coefficients and means for storing said updated coefficients, said stored coefficients being applied to the individual signal weighting means to weight the outputs of the tapped delay lines.

In one embodiment of the invention separate identical lattice filter means are provided for each of the antenna element signal to compute weight vectors for updating the weight coefficients for the outputs of the respective tapped delay line.

In an alternative embodiment of the invention there is provided a single lattice filter means and means for time multiplexing the antenna element signals to the filter means whereby the filter means is operated in a time shared mode.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
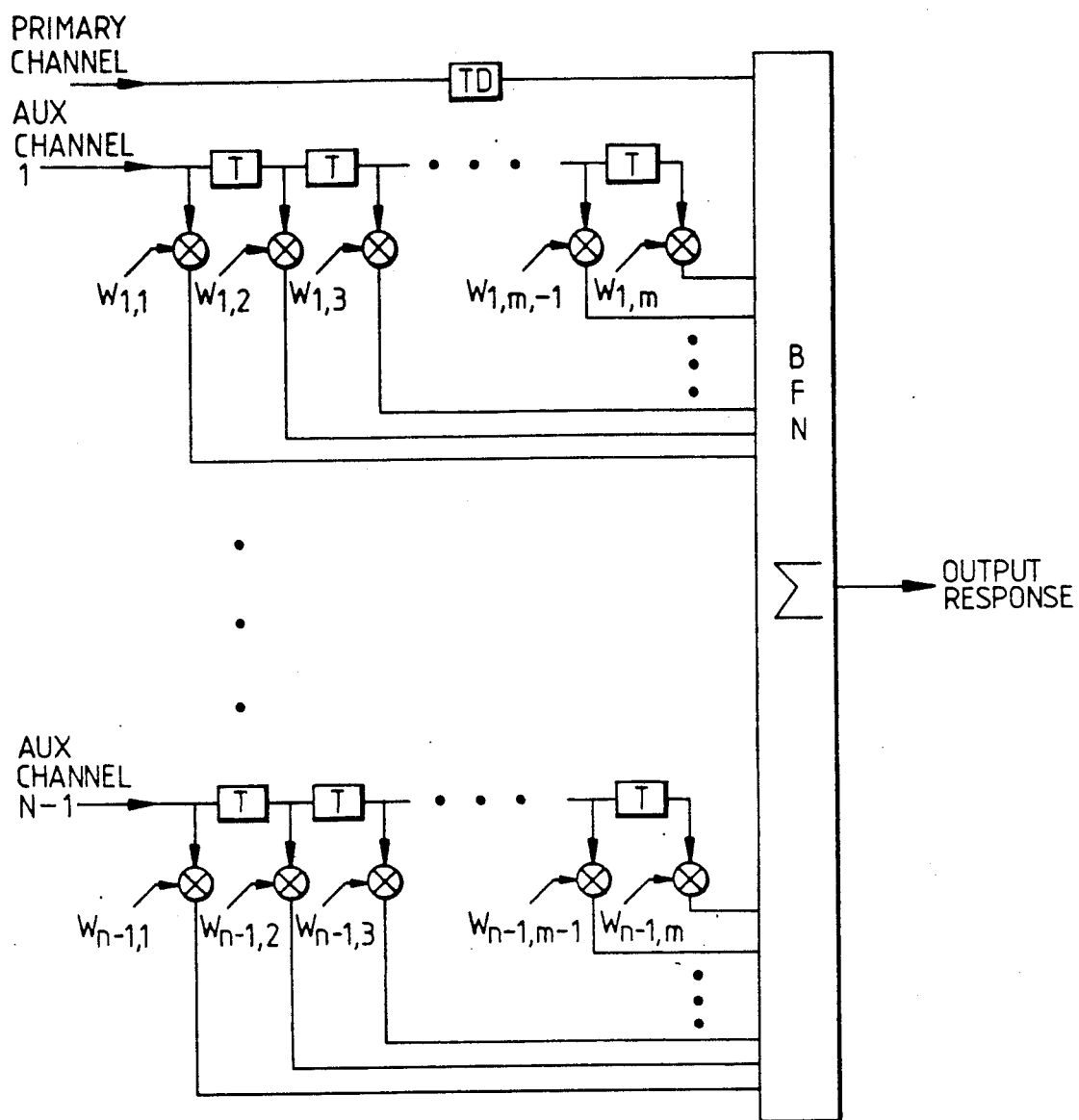
FIG. 1 illustrates a prior art beamforming arrangement for a broadband adaptive array (already referred to)
Figure 4:
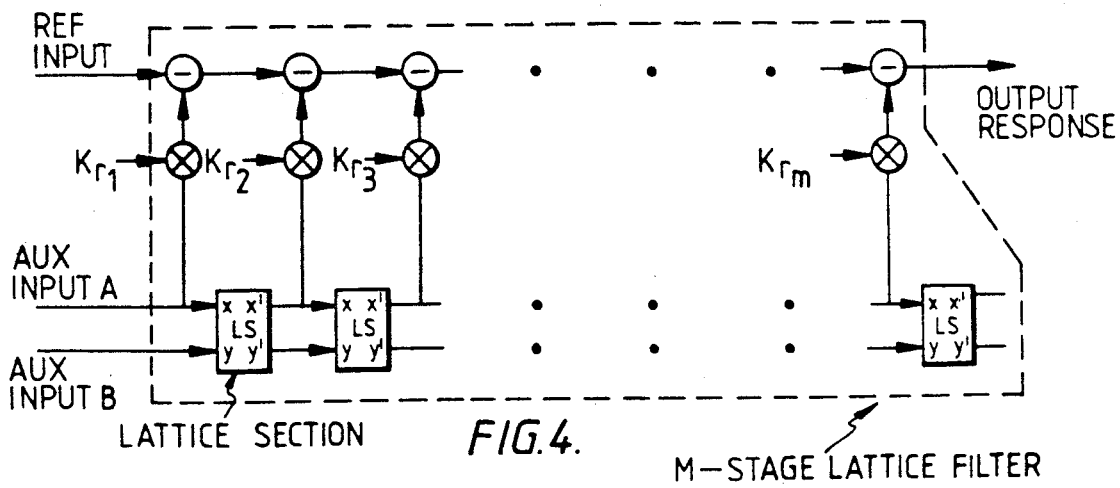
FIGS. 4 & 5 illustrate implementation and operation of a simple two-channel system using a lattice filter.
Figure 2:
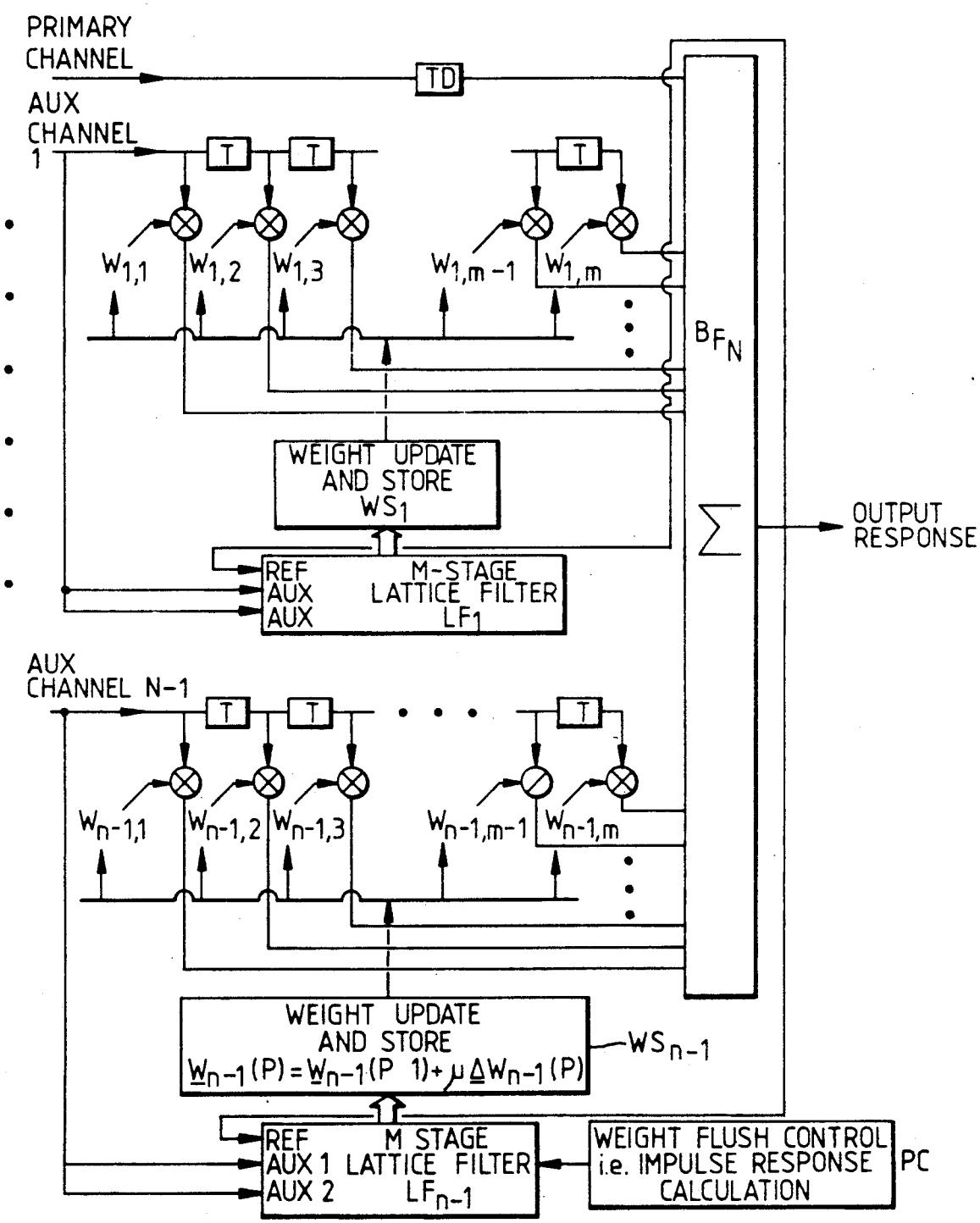
FIG. 2 illustrates a partitioned off-line processor for a broad band accelerated convergence adaptive array.
Figure 5:
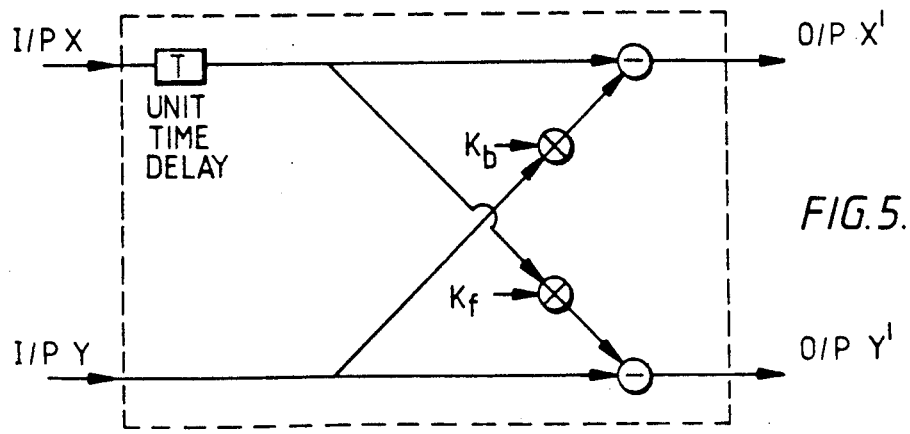

In the arrangement shown in FIG. 2 the weights to be applied to the outputs of the tapped delay lines are updated by weight correction vectors derived from m-stage lattice filters $LF_1 \ldots LF_{n-1}$. Each lattice filter is constructed of a number of identical stages or sections LS (FIG. 4) in cascade. The signal from the appropriate antenna element, i.e. auxiliary channel, is fed to the two inputs X, Y of the basic lattice structure. A typical lattice section LS is shown in FIG. 5. Input X is applied via a time delay T and then the X and Y signals are applied to the appropriate cross multiplier structure. After processing each section provides two outputs, $X^1$ and $Y^1$. For the adaptive antenna application the $X^1$ outputs of each lattice section are subjected to a scaling factor and then combined with the output response from the beamformer BFN.

The operation of the lattice filters and lattice sections presented here is well known. Appropriate algorithms for least squares lattices are readily discussed in "Adaptive Filters" by C. F. N. Conan and P. M Grant (Prentice Hall Signal Processing Series, 1985) and "Adaptive Filter Theory" by S. Haykim (Prentice Hall Information and System Sciences Series, 1986).

Returning now to FIG. 2, the operation of the m-stage lattice filters is controlled by a process controller PC which produces, for example, weight flush control signals to cause the weight correction vectors to be flushed out of the filters at the correct time intervals. The weight flush control calculates impulse response of the lattice filter. The flushed out impulse coefficients from the filters (represented in vector notation by *

$W_i(P)$ for the $i^{th}$ lattice filter at the $p^{th}$ recursion) are applied to update the weights in respective stores $WS_1 \ldots WS_{n-1}$ where the weights to be applied to the tapped delay line outputs are held.

Figure 3:
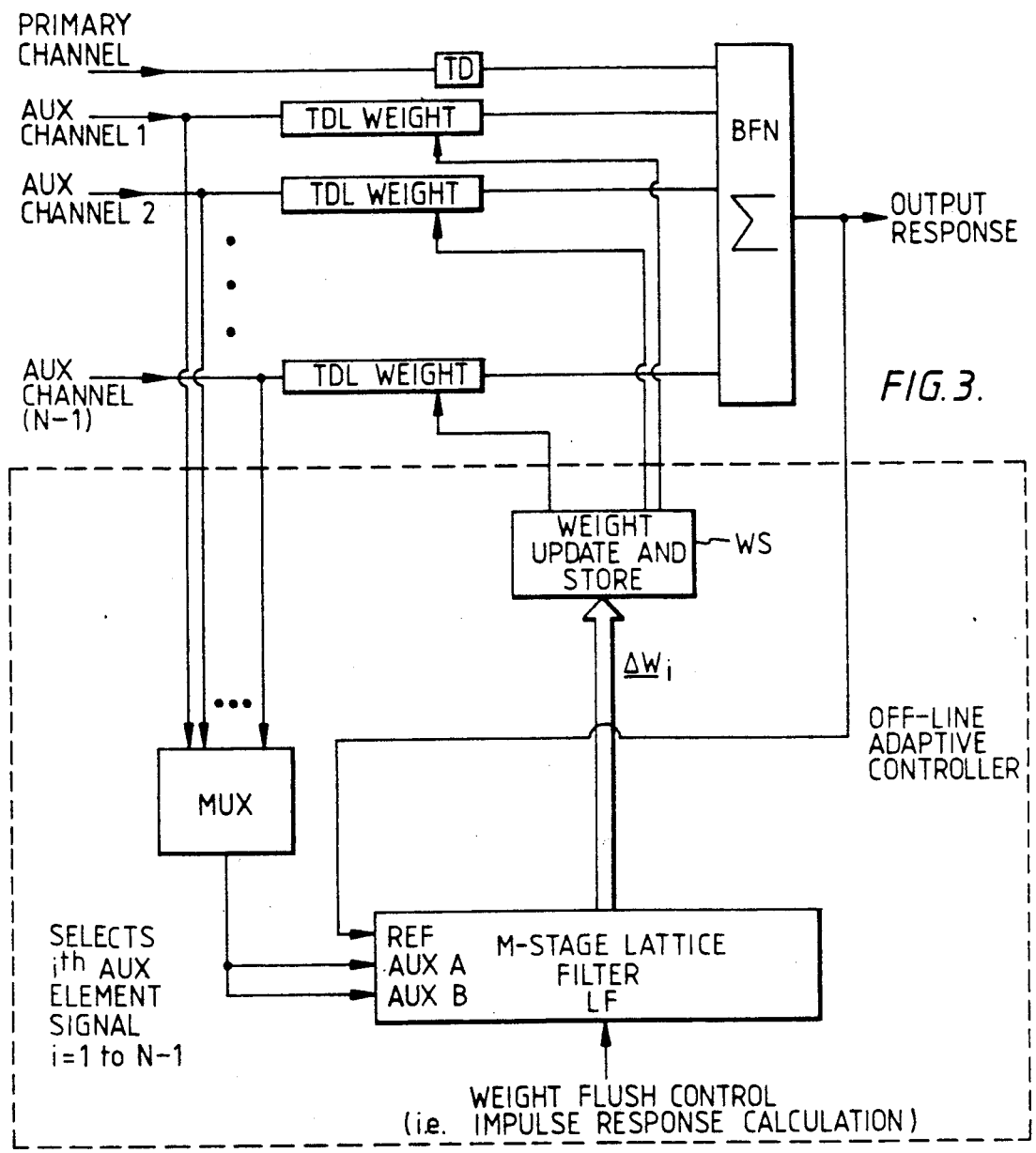
FIG. 3 illustrates a time-multiplexed off-line processor for a broadband accelerated convergence adaptive array.

In the arrangement shown in FIG. 3 instead of using a number of lattice filters, one for each tapped delay line, a single lattice filter LF is used in a time-shared mode. The auxiliary channel signals from the antenna elements are applied to a time division multiplexer MUX from which the multiplexed signals are fed to the filter LF. The weight correction vectors * $W_i$ are supplied to the weight update-and-store circuit WS for all the tapped delay lines.

The use of off-line lattice filters to produce weight correction vectors offers various levels of reduced circuit complexity while retaining a significant improvement in convergence compared with more conventional adaptive weight control techniques e.g. the Widrow LMS technique.

I claim:

1. An off-line processor arrangement for a broadband accelerated convergence adaptive antenna array, the arrangement including
    a plurality of antenna elements,
    a like plurality of tapped delay lines, the signal output of each antenna element being applied to the input of a respective one of the tapped delay lines,
    a number of individual signal weighting means to each of which is applied the output of a respective one of the outputs of a tapped delay line, and
    a beamforming network to which is applied the outputs of the weighting means, the arrangement further including
    lattice filter means to which are applied the signal outputs of the antenna elements,
    means for applying to the lattice filter means the output response of the beamforming network, wherein the lattice filter means is arranged to compute sets of weight correction vectors for respective antenna element outputs,
    means for storing weight coefficients to be applied to the individual signal weighting means,
    means for applying said computed weight correction vectors to said storing means to update said stored weight coefficients, and
    means for applying said stored and updated weight coefficients at timed intervals to the individual signal weighting means, to weight the outputs of the tapped delay lines.

2. An arrangement according to claim 1 wherein a single lattice filter means is provided, the arrangement further including
    means for time multiplexing the signal output of the antenna elements to the lattice filter means whereby the lattice filter means is operated in a time shared mode.

* * * * *